UNITED STATES PATENT OFFICE.

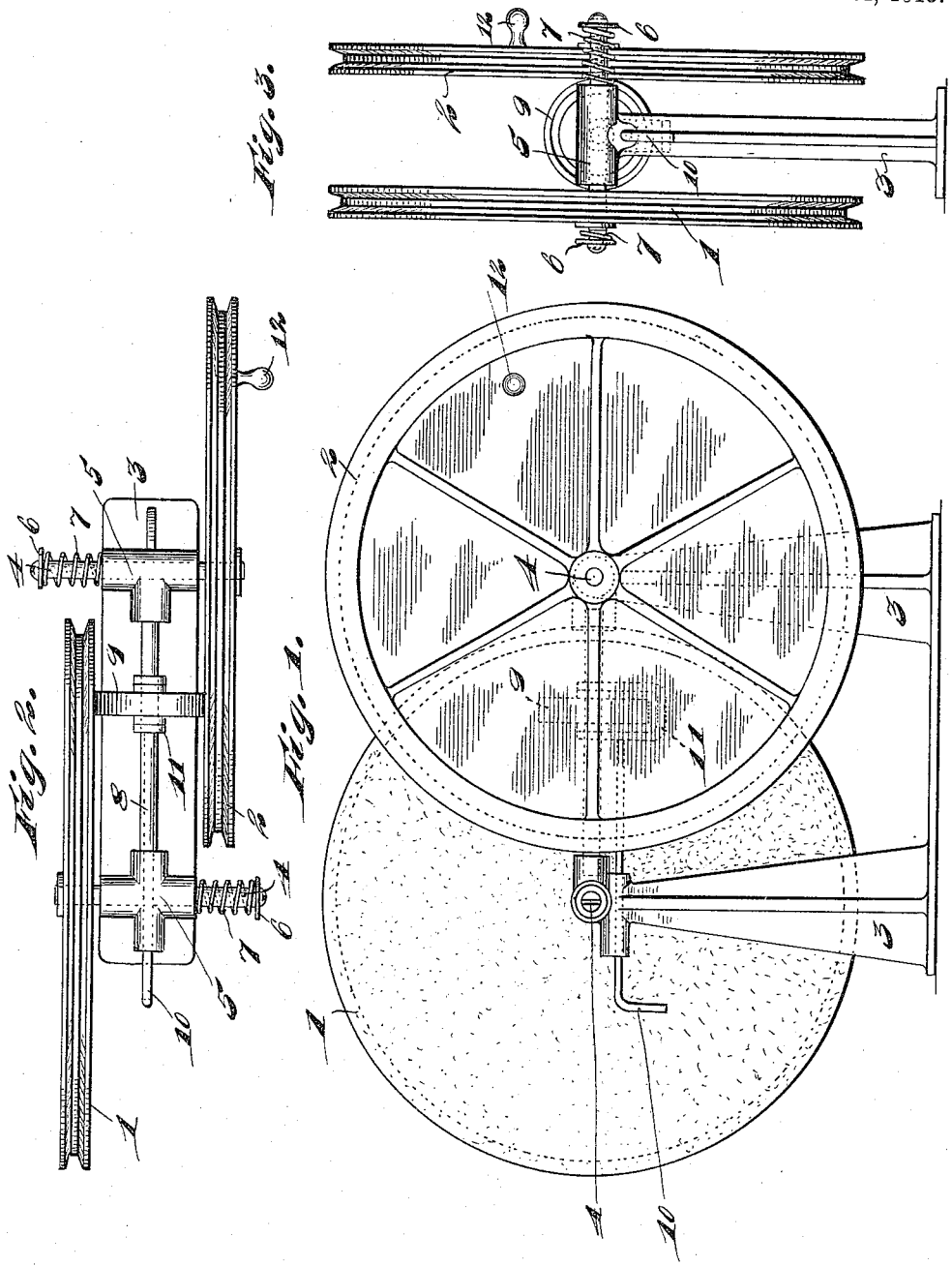

DALLAS C. WOODWORTH, OF ROCK ISLAND, ILLINOIS.

SPEED-VARYING MECHANISM.

1,165,353.  Specification of Letters Patent.  Patented Dec. 21, 1915.

Application filed September 9, 1912. Serial No. 719,340.

*To all whom it may concern:*

Be it known that I, DALLAS C. WOODWORTH, a citizen of the United States, and a resident of the city of Rock Island, county of Rock Island, and State of Illinois, have invented certain new and useful Improvements in Speed-Varying Mechanisms, of which the following is a specification.

My invention relates to improvements in speed varying mechanism and has for its object the provision of improved mechanism of this character which is of simple construction and efficient in use.

The invention consists in the combinations and arrangements of parts hereinafter fully described and claimed.

The invention will be best understood by reference to the accompanying drawings forming a part of this specification and in which, Figure 1 is a side elevation of the mechanism embodying my invention, Fig. 2 is a top plan view of the same, Fig. 3 is an end view of the same.

The preferred form of construction as illustrated in the drawing, comprises two friction disks 1 and 2 mounted in a suitable frame 3 with their friction faces opposite each other and partially overlapped as shown. Each of these disks is mounted upon a shaft 4 which extends loosely through a bearing 5 in frame 3 and is provided with a washer 6 at its end. Compression springs 7 are imprisoned between washer 6 and bearing 5 in order to press disks 1 and 2 toward each other. A rod 8 is arranged in the frame 3 midway between disks 1 and 2 and parallel to the faces thereof, and a friction wheel 9 is loosely mounted on said rod in contact with the friction faces of both of the friction disks 1 and 2. An adjusting rod 10 is slidably mounted in frame 3 and is provided at its end with a yoke 11 engaging the hub of friction wheel 9 and serves as a means for adjusting said friction wheel radially with respect to both of the friction disks 1 and 2. As shown, the friction disks 1 and 2 also constitute grooved pulleys for the reception of belts for supplying power to the mechanism and taking power therefrom. Disk 2 is also provided with an operating handle 12 so that the same may be driven by hand. By this arrangement it will be observed, that upon adjusting friction wheel 9 on rod 8, said wheel will be adjusted simultaneously with respect to a radius of each of the disks 1 and 2, the radius of the place of contact between said wheel and said disks gradually increasing upon one of said disks and decreasing upon the other through said adjustments. This being so, it will be observed, that the speed of transmission from one disk to the other will be varied quickly and readily. The specific arrangement of parts constitutes a simple and efficient means for the purpose.

While I have illustrated and described the preferred form of construction for carrying my invention into effect, this is capable of variation and modification without departing from the spirit of the invention. I, therefore, do not wish to be limited to the precise details of construction as set forth, but desire to avail myself of such variations and modifications as come within the scope of the appended claims.

Having described my invention what I claim as new and desire to secure by Letters Patent is:

1. A device of the kind described comprising two parallel shafts bearings for said shafts; a friction disk on each shaft, each of said disks having a portion opposite a portion of the other disk; a rod between said shafts disposed at a right angle thereto; a friction wheel slidably and rotatably mounted on said rod; a U-shaped member disposed about said friction wheel and having its end portions slidably mounted on said rod and engaging the hubs of said friction wheel and adapted to move said friction wheel on said rod; and a manually operable arm carried by said U-shaped member and slidably mounted in bearings formed on one of the shaft bearings for moving the latter on said rod, substantially as described.

2. A device of the kind described comprising two parallel shafts; a friction disk on each shaft, each of said disks having a portion opposite a portion of the other disk; a rod between said shafts disposed at a right angle thereto; fixed bearings for said rod; a friction wheel slidably and rotatably mounted on said rod; a U-shaped member disposed about said friction wheel and having its end portions slidably mounted on said rod and engaging the hubs of said friction wheel and adapted to move said friction wheel on said rod; a manually operable arm carried by said U-shaped member for moving the latter on said rod; and resilient means on each shaft maintaining its respective disk resiliently against said friction wheel, substantially as described.

In testimony whereof I have signed my name to this specification in the presence of two subscribing witnesses.

DALLAS C. WOODWORTH.

Witnesses:
JAMES E. REIDY,
MARGUERITE FLAHERTY.

Copies of this patent may be obtained for five cents each, by addressing the "Commissioner of Patents, Washington, D. C."